United States Patent
Gaull et al.

(10) Patent No.: US 6,270,827 B1
(45) Date of Patent: *Aug. 7, 2001

(54) INFANT FORMULA COMPOSITIONS AND METHOD OF MAKING

(76) Inventors: Gerald E. Gaull, deceased, late of Evanston, IL (US); by Florence McSherry Gaull, 4200 Massachusells Ave. NW., #105, Washington, DC (US) 20016

( * ) Notice: Subject to any disclaimer, the term of this patent is extended or adjusted under 35 U.S.C. 154(b) by 0 days.

This patent is subject to a terminal disclaimer.

(21) Appl. No.: 09/428,369

(22) Filed: Oct. 28, 1999

Related U.S. Application Data

(63) Continuation of application No. 07/759,100, filed on Sep. 6, 1991, now Pat. No. 6,020,015, which is a continuation-in-part of application No. 07/247,981, filed on Sep. 22, 1988, now abandoned.

(51) Int. Cl.$^7$ .................................................. D23C 9/00
(52) U.S. Cl. ........................ 426/580; 426/656; 426/801; 435/192; 435/206; 530/360; 530/365; 530/387
(58) Field of Search .................................... 426/580, 801, 426/656; 530/360, 365, 387; 435/192, 206

(56) References Cited

U.S. PATENT DOCUMENTS

| | | |
|---|---|---|
| 4,216,236 | 8/1980 | Müller et al. |
| 4,303,692 | 12/1981 | Gaull . |
| 4,419,369 | 12/1983 | Nichols et al. . |
| 4,497,836 | 2/1985 | Marquardt et al. . |
| 4,579,821 | 4/1986 | Palmiter et al. . |
| 4,617,190 | 10/1986 | Montgomery et al. . |
| 4,670,268 | 6/1987 | Mahmoud et al. . |
| 4,670,285 | 6/1987 | Clandinin et al. . |
| 4,753,926 | 6/1988 | Lucas et al. . |
| 4,782,138 | 11/1988 | Rialland et al. . |
| 4,977,137 | 12/1990 | Nichols et al. . |
| 5,739,407 * | 4/1998 | Bergström et al. ................... 426/801 |
| 5,795,611 * | 8/1998 | Slattery ................................ 426/580 |
| 6,020,015 * | 2/2000 | Gaull ................................... 426/801 |

FOREIGN PATENT DOCUMENTS

| | | |
|---|---|---|
| 0 181 634 | 5/1986 | (EP) . |
| 0 279 582 | 8/1988 | (EP) . |
| 2 497 205 | 2/1982 | (FR) . |
| 60-58920 | 4/1985 | (JP) . |
| 87/04050 | 7/1987 | (WO) . |
| 88/00239 | 1/1988 | (WO) . |
| 88/01648 | 3/1988 | (WO) . |
| 88/10118 | 12/1988 | (WO) . |

OTHER PUBLICATIONS

Hilpert, et al. "Bovine Milk Immunoglobulins, Immunobiological Adaptation of Infant Milk Formulae" *Acute Diarrhea: Its Nutritional Consequences in Children* Bellanti, J.A. Ed., 1983, pp. 123–128.

Mietens, et al. "Bovine Milk Immunoglobulins, Potential Use of Bovine Milk Immunoglobulins," *Acute Diarrhea: Its Nutritional Consequences in Children* Bellanti, J.A. Ed., 1983, pp. 111–121.

Simons, et al. "Alteration of the Quality of Milk by Expression of Sheep β–lactoglobulin in Transgenic Mice," *Nature*, Aug. 1987, 328:530–533.

Hall, et al. "Organization and Sequence of The Human Alpha–Lactalbumin Gene," *Biochemical Journal*, Jan. 1987 (London, England), 242: 735–742.

Sharmonov, et al. "Multicomponent Additive for Infant Formula Enriched with Essential and Protective Factors," *Kazakhstan Div. of the Inst. of Nutrition, U.S.S.R. Acad. Of Med. Sci.* Vopr. Pit. 1986, #3, 59–62.

Palmiter, et al. "Transgenic Mice," *Cell*, Jun. 1985, 41:343–345.

Reiter, "The Biological Significance and Exploitation of Some of the Immune Systems in Milk—A Review," *Microbiologie*, 1984, 2:1–20.

Glover, "Principals of Ultrafiltration and the Concentration and Fractionation of Cow's Milk," *Human Milk Banking*, A.F.Williams, ed. (Raven Press 1984), 1–16.

Hilpert, "Preparation of a Milk Immunoglobulin Concentrate from Cow's Milk," *Human Milk Banking*, A.F. Williams, ed., (Raven Press 1984) pp. 17–28.

Reiter, "Role of Nonantibody Proteins in Milk in the Protection of the Newborn," *Human Milk Banking*, A.F. Williams, ed., (Raven Press 1984) pp. 29–53.

Hylmö, et al. "Preparation of Fat and Protein from Banked Human Milk: Its Use in Feeding Very–Low–Birth–Weight Infants," *Human Milk Banking*, A.F. Williams, ed., (Raven Press 1984) pp. 55–61.

Gaull, et al. "Growth Modulators in Human Milk: Implications for Milk Banking," *Human Milk Banking*, A.F. Williams, ed., (Raven Press 1984) pp. 63–71.

(List continued on next page.)

*Primary Examiner*—Helen Pratt
(74) *Attorney, Agent, or Firm*—McDonnell Boehnen Hulbert & Berghoff

(57) ABSTRACT

Compositions containing human milk proteins, including the so-called host resistance factors of human milk, prepared by chemically synthesizing the human milk proteins or by genetic engineering techniques for producing recombinant human milk proteins, are useful for supplementing or enhancing the diet of infants, particularly very-low-birth-weight infants. The human milk proteins include the host resistance factors (HRF) found in human milk, such as lactoferrin (LF), lactoperoxidase (LP), lysozyme (LZ), immunoglobulin-A (IgA), alpha-lactalbumin, alpha, beta, kappa-caseins, and others. The compositions may also include components other than the human milk proteins useful for improved infant nutrition. In the utilization of the compositions of this invention, the compositions would be administered to an infant in at least an amount that the infant would receive if fed substantially only fresh human milk. Also, the proportions of the human milk proteins would preferably be present in the compositions in about the proportions these proteins are found in human milk.

22 Claims, No Drawings

OTHER PUBLICATIONS

Craig, et al., "Cloning Proteins from Human and Guinea Pig Milk," *Human Milk Banking*, A.F. Williams, ed., (Raven Press 1984 ) pp. 73–84.

Lindblad, et al, "Lactoengineering: a Method for Estimation of the Human Milk Protein Requirements of Very–Low–Birthweight Infants," *Human Milk Banking*, A.F. Williams, ed., (Raven Press 1984) pp. 159–168.

Senterre, et al., "Nitrogen, Fat, and Mineral Balance Studies In Low–Birth–Weight Infants Fed with Banked Human Milk, Human Milk Formula, or Preterm Infant Formula," *Human Milk Banking*, A.F. Williams, ed., (Raven Press 1984) pp. 171–177.

Spik, et al., "Characterization and Properties of The Human and Bovine Lactotransferrins Extracted From The Faeces of Newborn Infants," *Acta Paediatr Scand* 71 pp. 980–985.

McClead, et al., "Oral Lactoferrin (LF) and Lactoperoxidase (LP) Decrease Mortality of Enterotoxigenic *E. Coli* (ETEC) Infection," *Neonatal Infections Diseases*, Abstract, pp. 417A No. 1464.

Marketing Intelligence Services, Ltd., *Misc. Beverages*, Abstract, Mar. 4, 1987, No. 74, p. 17.

Forsyth, "Endocrinology of Lactation," *Biochemistry of Lactation*, Mepham, T.B. ed. (Elsevier Science Publishers B.V.1983), pp. 309–349.

Campbell, et al, "Immune milk—A Historical Survey," *Dairy Science Abstracts* Sep. 1963, vol. 25, No. 9, pp. 345–358.

Friend, et al, "Newer Advances In Human Milk Substitutes For Infant Feeding," *Journal of Applied Nutrition*, vol. 35, No. 2, 1983 pp. 88–114.

Frohman, et al., "Cut, Paste, and Save: New Approaches To Altering Specific Genes In Mice," *Cell*, vol. 56, Jan. 27, 1989, pp. 145–147.

Pennica, et al., "Cloning and Expression of Human Tissue–Type Plasminogen Activator cDNA in *E. Coli,*" *Nature* vol. 301, Jan. 20, 1983 pp. 214–221.

Pittius, et al., "A Milk Protein Gene Promoter Directs The Expression of Human Tissue Plasminogen Activator cDNA To The Mammary Gland In Transgenic Mice," *Proc. Natl. Acad. Sci.* vol. 85, Aug. 1988, pp. 5874–5878.

Raiha, "Nutritional Proteins In Milk and The Protein Requirement of Normal Infants," *Feeding the Normal Infant Pediatrics*, the American Association of Pediatrics, 1985 pp. 136–141.

Oram, et al, "Inhibition of Bacteria By Lactoferrin and Other Iron–Chelating Agents," *Biochem. Biophys. Acta*, 1968, 170:351–365.

Gaull, et al. "Significance of Growth Modulators in Human Milk," *Feeding the Normal Infant* from Pediatrics, the American Association of Pediatrics, 1985 pp. 142–145.

Nichols, et al. "Human Lactoferrin Fortification of Formulas Promotes Thymidine Uptake into DNA of Rat Intestinal Crypt Cells" *Gastroenterology & Nutrition*, p. 273A.

Mortimer, Letter to *The Lancet*, Aug. 20, 1988, p. 452.

Otneaess, et al., "Studies On Non–Immunoglobulin Inhibitory Activity In Human Milk Against *E. Coli* Heat–Labile Enterotoxin, Rotavirus, and Respiratory Syncytial Virus," *Human Milk Banking*, A.F. Williams, ed., (Raven Press 1984) pp. 85–92.

Garza, et al., "Preparation and Evaluation of Fortified Human Milk For Very–Low–Birth–Weight Infants," *Human Milk Banking*, A.F. Williams, ed., (Raven Press 1984) pp. 101–112.

Lyster, et al., "Effect of Heat On Specific Proteins In Human Milk," *Human Milk Banking*, A.F. Williams, ed., (Raven Press 1984) pp. 93–100.

Freier, et al, "Loss of Immuno Components During The Processing of Human Milk," *Human Milk Banking*, A.F. Williams, ed., (Raven Press 1984) pp. 123–132.

Spik, et al., "Characterization and Biological Role of Human Lactotransferrin Complexes," *Human Milk Banking*, A.F. Williams, ed., (Raven Press 1984) pp. 133–144.

Williams, et al, "Human Milk Processing and The Nutrition of The Very–Low–Birthweight Infant: Discussion," *Human Milk Banking*, A.F. Williams, ed., (Raven Press 1984) pp. 179–184.

Qasba, et al., "Similarity of The Nucleotide Sequences of Rat Alpha–Lactalbumin and Chicken Lysozyme Genes," *Nature* Mar. 22, 1984, 308: 377–380.

Swift, et al, "Tissue Specific Expression of The Rat Pancreatic Elastase 1 Gene In Transgenic Mice," *Cell*, Oct. 1984, 38:639–646.

Brock, "Lactoferrin In Human Milk: Its Role In Iron Absorption and Protection Against Enteric Infection In The Newborn Infant," *Archives of Disease in Childhood*, 1980, 55:417–421.

Cox, et al., "Iron Binding Proteins and Influx of Iron Across The Duodenal Brush Border: Evidence For Specific Lactotransferrin Receptors In The Human Intestine," *Biochemica et Biophysica Acta*, 1979, 588:120–128.

Webb, et al., *Fundamentals of Dairy Chemistry* (Avi Publishing) 1974, pp. 465–469.

Bullen, et al., "Iron–Binding Proteins In Milk and Resistance To *Escherichia Coli* Infection In Infants," *British Medical Journal*, Jan. 8, 1972, pp. 69–75.

Aids Risk in Breast Milk, *The New York Times*, Jun. 14, 1988.

Tedder, Letter to *The Lancet*, Aug. 20, 1988, p. 452.

Margrethe, et al. "The Proteins in Whey," *Compl. Rend. Lab. Carlsberg Ser. Chim.*, vol. 23, No. 7.

"Beverages," Misc. Beverages, Marketing Intelligence Service Ltd. (1987) pp. 17–18.

B. Campbell, et al., "Immune Milk—A Historical Survey," Dairy Science Abstracts, vol. 25 No. 9, (Sep., 1963) pp. 345–358.

B. Reiter, "Role of Nonantibody Proteins in Milk in the Protection of the Newborn," *Human Milk Banking*, Williams and Baum, ed., (Vevey/Raven Press 1984) pp. 29–53.

B. Reiter, "The Biological Signifigance and Exploitation of Some of the Immune Systems in Milk—A Review[(1)]," (Microbiologie—Aliments—Nutrition 1984, vol. 2) pp. 1–20.

B.A. Friend, et al., "Newer Advances in Human Milk Substitutes for Infant Feeding," Journal of Applied Nutrition, vol. 35, No. 2 1983, pp. 88–114.

C. Pittius, et al., "A Milk Protein Gene Promoter Directs the Expression of Human Tissue Plasminogen Activator cDNA to the Mammary Gland in Transgenic Mice," Proc. Natl. Acad. Sci., vol. 85, (Biochemistry 1988) pp. 5874–5878.

D. Pennica, et al., "Cloning and Expression of Human Tissue–type Plasminogen Activator cDNA in *E. Coli,*" Nature, vol. 301 No. 20, (Macmillan Journals Ltd. 1983) pp. 214–221.

F.A. Glover, "Principles of Ultrafiltration and the Cencentration and Fractionation of Cow's Milk," *Human Milk Banking*, Williams and Baum, ed., (Vevey/Raven Press 1984) pp. 1–16.

G. Gram, et al., "Inhibition of Bacteria by lactoferrin and Other Iron–Chelating Agents," Biochim, Biophys, Acta, (1968) pp. 351–365, 273A.

G. Spik, et al., "Characterization and Properties of the Human Lactotransferrins Extracted From the Faeces of Newborn Infants," Spik, et al, ed., pp. 979–984.

Gaull, "Significance of Growth Modulators in Human Milk," Dept. of Human Development and Nutrition pp. 142–145.

Guall et al., "Growth Modulators in Human Milk: Implications for Milk Banking," *Human Milk Banking*, Williams and Baum, ed., (Vevey/Raven Press 1984) pp. 63–71.

H. Hilpert, "Preparation of a Milk Immunoglobulin Concentrate from Cow's Milk," *Human Milk Banking*, Williams and Baum, ed., (Vevey/Raven Press 984) pp. 17–28.

Hall, et al., "Organization and Sequence of the Human a–lactalbumin Gene," Blochem J. (1987) 242, 735–742 (Printed in Great Britain 1987).

Hilpert, et al., "Bovine Milk Immunoglobulins," *Acute Diarrhea: Its Nutritional Consequences in Children*, J. A. Bellanti, ed., (Raven Press 1983) pp. 123–128.

Hylmo, et al., "Preparation of Fat and Protein from Banked Human Milk: Its Use in Feeding Very–Low–Birth–Weight Infants," *Human Milk Banking*, Williams and Baum, ed., (Vevey/Raven Press 1984) pp. 55–61.

I. Forsyth, "The Endocrinology of Lactation," Biochemistry of Lactation, T.B. Mepham, ed., (Elsevier Science Publishers B.V. 1983) pp. 309–349.

J. Senterre, et al., "Nitrogen, Fat, and Mineral Balance Studies in Low–Birth–Weight Infants Fed with Banked Human Milk, Human Milk Formula, or Preterm Infant Formula," Human Milk Banking, Williams and Baum, ed., (Vevey/Raven Press 1984) pp. 171–177.

Lindblad, et al., Lactoengineering: A Method for the Estimation of the Human Milk Protein Requirements of Very–Low–Birth–Weight Newborn Infants. *Human Milk Banking*, A.F. Williams and J.D. Baum, ed., (Vevey/Raven Press 1984) pp. 159–168.

M. Frohman, et al., "Cut, Paste, and Save: New Approaches to Altering Specific Genes in Mice," Cell, vol. 56, (Cell Press 1989) pp. 145–147.

McClead et al., "Oral Lactoferrin (LF) and Lactoperoxidase (LP) Decrease Mortality of Enterotoxigenic *E. Coli* (ETEC) Infection," *Neonatal Infectious Diseases*, Richard E. McClead, mary Lentz p. 1464.

Mietens, et al., "Bovine Milk Immunoglobulins," Potential Use of Bovine Milk Immunoglobulins, *Acute Diarrhea: Its Nutritional Consequences in Children*, J. A. Bellanti, ed., (Raven Press 1983).

Palmiter, et al., "Transgenic Mice," (Cell, vol. 41 1985) pp. 343–345.

R. Craig, et al., "Cloning Proteins from Human and Guinea Pig Milk," Human Milk Banking, Williams and Baum, ed., (Vevey/Raven Press 1984) pp. 73–84.

Raiha, "Nutritional Proteins in Milk and the Protein Requirement of Normal Infants," pp. 136–141.

Rhein, et al., "Freeing Hemophiliacs From the Risk of Aids," (Business Week Feb. 13, 1987) p. 38.

Simons, et al., "Alteration of the Quality of Milk by Expression of Sheep B–lactoglobulin in Transgenic Mice," *Letters to Nature*, J. Paul Simons, M. McClenaghan & A. John Clark, (Nature vol. 328 1987) pp. 530–533.

T.Sh. Sharmanov, et al., "Multicomponent Additive for Infant Formula Enriched with Essential and Protective Factors," Kazakhstan Division of the Institute of Nutrition, USSR Academy of Medical Science, Alma–Ata, (Vopr. Pitan 1986) pp. 1–7.

\* cited by examiner

INFANT FORMULA COMPOSITIONS AND METHOD OF MAKING

RELATED APPLICATIONS

The present application is a continuation-in-part of U.S. Ser. No. 07/759,100, filed Sep. 6, 1991 (now U.S. Pat. No. 6,020,015) which is a continuation of U.S. Ser. No. 07/247,981, filed Sep. 22, 1998 (abandoned).

FIELD OF THE INVENTION

This invention relates to infant nutrition and in one embodiment it is particularly applicable to the enhancement or improvement of synthetic infant formulas. Another embodiment of this invention is concerned with improving the nutrition of very-low-birth-weight infants.

BACKGROUND OF THE INVENTION

It has been considered for a long time by nutritionists that the best food or nutrition supplied to an infant is its own mother's milk; i.e. fresh human milk. It is recognized, however, that many situations arise wherein the infant cannot be fed mother's milk and as a result synthetic infant milk formulas, predominantly based on cow's milk, have been prepared and used to nourish an infant. However, since it is generally believed that human milk provides superior nutrition for infants, much effort has been made to improve synthetic infant milk formulas to more closely simulate mother's milk. For example, U.S. Pat. No. 4,303,692 (1981) discloses a synthetic infant milk formula which includes taurine at a level substantially equivalent to that found in human milk. In the manufacture of synthetic infant formula based on cow's milk, the taurine content of the cow's milk is low and may be diluted during the manufacture of the synthetic infant formula with the result that the produced synthetic infant formula contains a very low level of taurine. This was corrected, as disclosed in U.S. Pat. No. 4,303,692, by the addition of taurine to synthetic infant formula to bring its taurine content up to the level taurine is present in human milk. However, there are still many other components of fresh human milk which are not found in synthetic infant milk formulas, either cow milk-based formulas or soy protein-based formulas, which can and have usefully been added to synthetic infant formulas to provide an improved product for infant nutrition.

The protein and non-protein composition of the human milk and cow milk is described and set forth in the article by N. C. R. Raiha entitled "Nutritional Proteins in Milk and the Protein Requirement of Normal Infants", which appeared in the publication *Feeding the Normal Infant-Supplement,* Pediatrics pp. 136–141 (1985), published by the *American Academy of Pediatrics.* Among those proteins in human milk are listed alpha-lactalbumin, lactoferrin, serum albumin, lysozyme, the immunoglobulins, mainly IgA and other proteins as well.

In the article by B. A. Friend et al. entitled "Newer Advances in Human Milk Substitutes for Infant Feeding" appearing in *Journal of Applied Nutrition,* Vol. 35, No. 2, (1983), pp. 88–115, there is disclosed in some detail the composition of human milk compared with cow milk, evaporated milk formula, conventional synthetic infant milk formula based on cow milk and a synthetic protein milk-free formula. Additionally, there are comparisons made between the protein and non-protein nitrogen components in human milk and in cow milk including the various caseins which are to be found in human milk, viz. alpha-casein, beta-casein and kappa-casein. It is mentioned therein that human milk has a higher proportion of alpha-lactalbumin but no beta-lactoglobulin and that the host resistance factors or anti-microbial proteins of human milk, viz, lactoferrin, lysozyme and secretory IgA, account for 75% of the protein in human colostrum as compared with 39% in mature human milk and less than 0.1% in cow's milk. This article also lists those host resistance factors present in human milk but absent in cow milk, viz. lymphocytes, macrophages, and secretory IgA. Lactoferrin is present in a relatively high amount in human milk but in only a low amount in cow milk, whereas lactoperoxidase is present in a relatively low amount in human milk but in a high amount in cow milk. Lysozyme and bifidus-stimulating factors are to be found in a significant amount in human milk but only in trace amounts in cow milk. Similarly complement (C1–C9) is to be found in human milk but has not been positively identified in cow milk. The vitamin binding proteins are found in high amounts in human milk but in low amounts in cow milk.

It is seen, therefore, that if a synthetic infant milk formula is prepared based on cow's milk, it would be difficult, if not impossible, to more closely simulate the protein composition of human milk. To this end, i.e. more closely to simulate human milk, it is necessary that there be added to or incorporated in cow milk-based synthetic infant milk formulas, soy protein or meat-based synthetic infant formulas, those components which are present in human milk but are substantially absent from cow milk and the like. This is especially true in that in addition to their nutritional value, per se, many of the proteins of human milk have functional and/or protective value as well which cannot be duplicated in synthetic infant formulas based on bovine or soy proteins.

Accordingly, it is an object of this invention to provide a synthetic infant milk formula which more closely simulates the composition of fresh human milk.

It is another object of this invention to provide protein components or compositions useful for enhancing or improving the nutritional and functional or protective value of synthetic infant milk formulas and also banked or pooled human milk.

It is yet another object of this invention to provide compositions useful for incorporation into the diet of an infant so as to enhance and improve the nutritional and functional or protective value of the diet.

Still another object of this invention is to provide techniques and routines for improving the diet and feeding of infants, particularly very-low-birth-weight infants.

How these and other objects of this invention are achieved will become apparent in the light of the accompanying disclosure. With respect to the disclosure of this invention, the disclosure of all the publications cited herein, including U.S. Pat. No. 4,303,692, are herein incorporated and made part of this disclosure.

SUMMARY OF THE INVENTION

Compositions containing human milk proteins, including the so-called host resistance factors (HRF) of human milk, are useful and are employed to enhance and improve the nutritional value of an infant's diet by including such compositions in the infant diet. These compositions can be incorporated in human milk, either pooled, banked or the mother's own; in synthetic infant milk formulas based on cow's milk or soy protein, or can be supplied directly to the infant.

In the practices of this invention the nutritional, functional, or protective human milk proteins, including the so-called host resistance factors (HRF) of human milk, are prepared by chemically synthesizing the same or by employing genetic engineering techniques for producing the nutritional, functional and/or protective human milk proteins including the host resistance factors, as recombinant human milk proteins or recombinant host resistance factors. These human milk proteins including the host resistance factors, because of their complexity and/or functionality, are preferably made by DNA genetic engineering techniques as recombinant human milk proteins or recombinant host resistance factors.

Suitable recombinant, nutritional and/or functional human milk proteins and recombinant host resistance factors of human milk upon which this invention is based include recombinant lactoferrin (LF), recombinant lactoperoxidase (LP), recombinant lysozyme (LZ), recombinant immunoglobulin-A (IgA), recombinant alpha-lactalbumin, recombinant bifidus-stimulating factors, recombinant vitamin-binding proteins, recombinant mineral binding proteins and others. Desirably, these chemically synthesized or recombinant nutritional and/or functional human milk proteins or host resistance factors would be incorporated in amounts and proportions, when employed to enhance the value of the synthetic infant milk formula, so that the resulting formula contains these incorporated materials in an amount and/or proportion that these materials are normally found in fresh human milk. Also, compositions of this invention could be provided so as to contain these human milk proteins and host resistance factors in concentrated amounts, that are much greater than that found on a similar weight or volume basis of fresh human milk, e.g. in the range of 2 to 1000–5000 times the concentration, with the result that these concentrated compositions could be added to a relatively large volume of synthetic infant milk formula so as to bring up the concentration of these added compounds to a value similar to or greater than those found in fresh human milk.

One advantage of employing chemical synthesis or genetic engineering techniques for the manufacture of nutritional and/or functional human proteins and the host resistance factors of human milk, is the resulting produced materials would be free of the AIDS or human immunodeficiency virus (HIV), such as HIV-I, HIV-II and other viruses including but not limited to cytomegalic inclusion virus. In the past, the human milk proteins, particularly the so-called host resistance factors, have been recovered or produced from fresh human milk. Since these resulting produced materials are often pooled or are produced from pooled human milk, there is a danger that the resulting produced and recovered human milk proteins, including the host resistance factors could contain HIV in one of the contributors to the pooled human milk or the pooled human milk proteins had AIDS or was injected with HIV. This is not a reasonable possibility when the nutritional and/or functional human milk proteins, including the so-called host resistance factors, are produced as recombinant human milk proteins or recombinant host resistance factors employing genetic engineering techniques. Similarly, if these human milk proteins or host resistance factors are manufactured by chemical synthesis which, because of the complexity of these materials, would be difficult to do, these materials produced by chemical synthesis would also be free of HIV.

DETAILED DESCRIPTION OF THE INVENTION

A host resistance factor which is particularly suitable for manufacture by recombinant DNA techniques in accordance with this invention is human lysozyme as found in human milk. Human lysozyme, as indicated hereinabove, is found in human milk and serves, among other things, to protect the infant from bacterial infection. In fact, it has even been proposed to employ human lysozyme derived from human milk to enrich synthetic cow milk-based formula so that the lysozyme-enriched cow-based infant formula more closely approximates human milk with respect to lysozyme content and activity, see the article by B. Haneberg et al. entitled "Lysozymes in Feces from Infants and Children" which appeared in *Acta Paediatr Scand.* 63:588–594 (1974).

Also, with respect to the utilization of lysozyme in infant formula so as to enhance the biological value of infant formulas based on cow's milk, reference is made to the article by T. Sh. Sharmanov et al. entitled "Multicomponent Additive for Infant Formula Enriched with Essential and Protective Factors", Kazakhstan Division of the Institute of Nutrition, USSR Academy of Medical Science, Alma-Ata, published in *Vopr. Pitan* 1986, #3, pp. 59–62 (1986).

Of special interest with respect to the preparation or production of human lysozyme by genetic engineering DNA techniques for the production of a recombinant human lysozyme, reference is hereby made to EPO Application 181,634, published Jun. 21, 1986. This European patent publication discloses DNA genetic engineering techniques employing the gene for human lysozyme including a method of preparing a vector containing the gene, the transformation of cells with the vector containing the lysozyme gene and the culturing of the transformed cells for the production and recovery of the resulting produced recombinant human lysozyme. It is disclosed that the recombinant human lysozyme thus produced had functional applications for anti-inflammation, hemostatic, tissue regeneration and antitumor. It also discloses other applications for use of human lysozyme in an eye wash as an anti-inflammation enzyme and as a food antiseptic. Human lysozyme has advantages over non-human lysozyme, such as egg white lysozyme, since it does not have side effects due to the body's immune response when used for medical purposes. This European patent publication clearly teaches the production of recombinant human lysozyme, a product useful in the practices of this invention.

Another compound of special interest in recombinant form as produced by DNA genetic engineering techniques for use in compositions in the practices of this invention is human lactotransferrin or human lactoferrin which is found in human milk and which has been characterized and identified as a glycoprotein. Specifically, the polypeptide chain of human lactoferrin has been identified and found to possess two glycosylation sites to which glycans are linked through an N-(d-aspartyl)-N-acetylglocosaminyamine bond and which are structurally heterogeneous. Accordingly, the make-up and structure of human lactotransferrin is known.

Recombinant lactotransferrin or lactoferrin (LF) is particularly useful as a component in the preparation of compositions in accordance with this invention and the use of such compositions. The functional role of lactotransferrin in human milk, particularly its role in iron absorption and its role in protection against enteric infection in a newborn infant is described in an article entitled "Lactoferrin in Human Milk: Its Role in Iron Absorption and Protection Against Enteric Infection in the Newborn Infant", published in *Archives of Diseases in Childhood,* Vol. 55, pp 417–421 (1980). This article emphasizes that human milk is unusually rich in lactoferrin and that lactoferrin was first reported in 1939 by the investigators, M. Sorensen et al. in an article entitled "The Proteins in Whey", published *C. R. Lab (Carlsberg)[Ser Chim],* Vol. 23, pp. 1 55–59 (1939).

The role of a lactoferrin in human milk is the subject of the article entitled "Iron-Binding Proteins in Milk and Resistance to *Escherichia coli* Infection in Infants" by J. R. Bullen et al., published in the *British Medical Journal*, pp. 69–75 (Jan. 8, 1972). Further, the article by J. D. Oram et al. entitled "Inhibition of Bacteria by Lactoferrin and Other Iron-Chelating Agent", published in *Biochimica et Biophysica Acta*, 170, pp. 351–365 (1968), discloses that human lactoferrin when not fully saturated with iron is bacteriostatic with respect to *Bacillus stearothermophilus* and *Bacillus subtilis*, both in the presence and absence of trace amounts of metals. Another article of interest as to the role of lactoferrin is the article of T. M. Cox et al. entitled "Iron Binding Proteins and Influx or Iron Across the Duodenal Brush Border—Evidence for Specific Lactotransferrin Receptors in the Human Intestine", *Biochimica et Biophysica Acta*, Vol. 588, pp. 120–128 (1979). This article discloses that lactotransferring coats the luminal surface of the small intestine and shows a remarkable physio-chemical homology with other transferrins and that the proteins may be distinguished from human serum transferrin by its immunological properties, its glycan sequences, its conformation and by the localization of the two iron-binding sites on the protein.

Still another article by G. Spik et al. entitled "Characterization and Properties of the Human and Bovine Lactotransferrins Extracted from the Faeces of Newborn Infants", published in *Acta Paediatr Scan*, 71:979–985 (1982), discloses that when a cow's milk diet for infants is supplemented by partially or completely iron-saturated human or bovine lactoferrin, the amount of copro-lactotransferrin excreted depended on the origin and on the iron saturation o the lactotransferrin. This article stated that the lactoferrins ingested by babies are not completely destroyed and keep their functional ability to bind iron and thus may supplement the protective bacteriostatic effects of the endogenous lactotransferrin in the intestinal tract.

Accordingly, in view of the above, it is obvious that much is known about the physical and chemical structure and make-up of human lactotransferrin and its utility when present in an infant diet.

Further, the article by B. Reiter entitled "The Biological Significance and Exploitation of Some of the Immune Systems in Milk—A Review", published in *Microbiologie—Aliments—Nutrition*, Vol. 2, pp. 1–20 (1984), reviews the human resistance factors or protective proteins found in human milk including the immunoglobulins, complements, lysozyme, lactoferrin, lactoperoxidase and others. In this article, special attention is given to the functional and protective roles of lysozyme in human milk and it is disclosed that feeding lysozyme to infants increases the immunoglobulin level in faeces (secretory IgA) compared with the faeces of infants fed formula feed only. This article also discloses the role of lactoferrin in inhibiting bacteria. Lactoperoxidase is also discussed in this article and its bactericidal effect in human milk, see also the article by J. H. Brock entitled "Lactoferrin in Human Milk. Its Role in Iron Absorption and Protection Against Enteric Infections in the Newborn Infant" published in *Archives of Diseases in Childhood*, 55, pp. 417–421 (1980).

Of special interest is the article by G. E. Gaull et al. entitled "Growth Modulators in Human Milk: Potential Roles", published by *Pediatrics* pp. 156–160. This article mentions that there are at least three major groups of non-cellular constituents in human milk. These groups comprise:

1) the so-called classical nutrients, i.e. proteins, lipids, lactose, vitamins and the major and trace minerals;

2) the so-called protective or human host resistance factors, such as secretory IgA mentioned herein; and 3) a newly recognized functional group consisting of growth modulators which includes small molecules, such as taurine, small hormone-like proteins, such as epidermal growth factor (EGF), enzymes and interferons. The last mentioned growth modulators are also protective factors. All these factors or groups are useful when chemically synthesized or in recombinant form in compositions in accordance with this invention.

Further, of special interest in the practice of the present invention is the paper by R. E. McClead et al. entitled "Oral Lactoferrin (LF) and Lactoperoxidase (LP) Decrease Mortality of Enterotoxigenic *E. coli* (ETEC) Infection", presented at the *American Pediatric Society/Society of Pediatric Research*—April, 1987 wherein it is concluded that supplemental feedings of lactoferrin at concentrations comparable to that in human milk decrease mortality from ETEC in suckling mice and that high concentrations of LP but not of LZ are also protective. This article speculates that infant formula containing LF and/or LP may prevent enteric infections in the newborn.

Another article of interest in connection with the practices of this invention is the article by S. K. Polberger et al. entitled "Growth and Metabolic Responses in Very-Low-Birth-Weight Infants (VLBW) Infants Fed with Ultrafiltrated Human Milk Protein Fortified Fresh Breast Milk—A Model for Optimal Feeding of VLBW-Infants?" also presented at the *Meeting of American Pediatric Society/Society of Pediatric Research*—April 1987. This article indicates that human milk protein obtained by ultrafiltration of human milk is nutritionally useful when employed to fortify the mother's own fresh human milk and that a significant correlation was found between protein intake and growth, serum urea, plasma, prealbumin and transferrin as well as many plasma and urine amino acids, with the optimal nutritional protein intake from human milk protein in VLBW-infants being between 3.0 and 3.5 g/kg/d.

Further, in another such article by B. L. Nichols et al. entitled "Human Lactoferrin Fortification of Formulas Promotes Thymidine Uptake into DNA of Rat Intestinal Crypt Cells" also presented at *Meeting of American Pediatric Society/Society of Pediatric Research*—April 1987, there is disclosed that cow milk-based and soy protein-based formulas to which lactoferrin has been added reverses the inhibition of thymidine uptake into the DNA of rat intestinal crypt cells as compared with the same formulas without the addition of human lactoferrin.

The above disclosures clearly indicate the advantages in accordance with this invention of incorporating into synthetic infant formulas that are cow milk-based and/or soy-based, one or more of the recombinant nutritional and/or functional human milk proteins including one or more of the recombinant host resistance factors found in human milk. Many of the human proteins including the host resistance factors of human milk are obtained by ultrafiltration from pooled human milk. As noted herein, there is a danger that the pooled human milk might be contaminated with HIV or other dangerous viruses. This is one reason in accordance with the practices of this invention that the nutritional and/or functional milk proteins including the host resistance factors of human milk, all as described herein above, be prepared and produced by chemical synthesis or by genetic engineering techniques. Such produced human milk proteins would be free of HIV and/or other dangerous viruses and could be produced in substantial amounts without dependency on the availability or supply of human milk.

Moreover, in accordance with this invention, such human milk proteins could be specially produce, such as human lysozyme and human lactotransferrin so that, in effect, tailor-made recombinant human milk protein compositions containing only, for example, human lysozyme or only human lactoperoxidase or human lactoferrin or human secretory IgA and others, or combinations thereof, could be produced in high purity. The production of human milk proteins by recombinant DNA techniques permits greater flexibility in the make-up and utilization of compositions in accordance with this invention when utilized to enhance the diet of infants, particularly VLBW infants or to enhance the nutritional and/or functional value of synthetic infant formulas, either cow milk-based, soy protein-based or meat-based, as indicated hereinabove. Instead of recombinant human milk proteins, one could employ in the practices of this invention human milk proteins produced by chemical synthesis where applicable or desired. Such chemically synthesized human milk proteins, like the corresponding recombinant proteins, would also be free of HIV and accordingly would also be usefully employed in the practices of this invention.

As will be apparent to those skilled in the art in the light of the foregoing disclosures, many modifications, alterations and substitutions are possible in the practices of this invention without departing from the spirit or scope thereof.

What is claimed is:

1. A concentrate of one or more synthetic or recombinant nutritional, functional or protective human milk proteins or host resistance factors of human milk suitable, after dilution in a liquid, for infant consumption, such that, when so diluted, said human milk proteins or said host resistance factors can be administered to or fed directly to an infant for consumption.

2. The concentrate of claim 1 wherein said human milk proteins or host resistance factors comprise secretory immunoglobulin-A, lactoferrin, lactoperoxidase, lysozyme, alpha-lactalbumin, alpha-casein, beta-casein, or kappa-casein.

3. A method of improving the nutritional, functional or protective value of a synthetic infant formula which comprises adding to said formula a composition including one or more synthetic or recombinant nutritional, functional or protective human milk proteins or host resistance factors of human milk.

4. The method in accordance with claim 3 wherein the amount of said composition added to said synthetic infant formula is sufficient such that when the infant formula is administered to an infant for consumption, the added synthetic or recombinant nutritional, functional or protective human milk proteins or host resistance factors in said synthetic infant formula are at a concentration substantially the same as the concentration of human milk proteins or host resistance factors found in human milk.

5. The method of claim 4 wherein the nutritional, functional and protective value of said synthetic infant formula is improved by adding to said synthetic infant formula an effective amount of recombinant human lactoferrin.

6. The method of claim 5 wherein the nutritional and protective value of said synthetic infant formula is further improved by adding to said synthetic infant formula an effective amount of recombinant human lysozyme.

7. The method of claim 6 wherein the nutritional and protective value of said synthetic infant formula is further improved by adding to said synthetic infant formula an effective amount of recombinant human lactoperoxidase.

8. The method of claim 7 wherein the nutritional and protective value of said synthetic infant formula is further improved by adding to said synthetic infant formula an effective amount of recombinant human immunoglobulin-A.

9. The method of claim 8 wherein the nutritional value of said synthetic infant formula is further improved by adding to said synthetic infant formula an effective amount of recombinant human alpha-lactalbumin.

10. The method of claim 9 wherein the nutritional value of said synthetic infant formula is further improved by adding to said synthetic infant formula an effective amount of recombinant human casein.

11. The method in accordance with claim 3 wherein the amount of said composition added to said synthetic infant formula is sufficient such that when the infant formula is administered to an infant for consumption, the added nutritional, functional or protective human milk proteins or host resistance factors in said synthetic infant formula are at a concentration ranging from about 2 to about 1000 times the concentration of human milk proteins or host resistance factors found in human milk.

12. The method of claim 11 wherein the nutritional, functional and protective value of said synthetic infant formula an effective amount of recombinant human lactoferrin.

13. The method of claim 11 wherein the nutritional and protective value of said synthetic infant formula is improved by adding to said synthetic infant formula an effective amount of recombinant human lysozyme.

14. The method of claim 11 wherein the nutritional and protective value of said synthetic infant formula is improved by adding to said synthetic infant formula an effective amount of recombinant human lactoperoxidase.

15. The method of claim 11, wherein the nutritional and protective value of said synthetic infant formula is improved by adding to said synthetic infant formula an effective amount of recombinant human immunoglobulin-A.

16. The method of claim 11 wherein the nutritional value of said synthetic infant formula is improved by adding to said synthetic infant formula an effective amount of recombinant human alpha-lactalbumin.

17. The method of claim 11 wherein the nutritional value of said synthetic infant formula is further improved by adding to said synthetic infant formula an effective amount of recombinant human casein.

18. The method of claim 17 wherein said recombinant human casein is alpha-casein.

19. The method of claim 17 wherein said recombinant human casein is beta-casein.

20. The method of claim 17 wherein said recombinant human casein is kappa-casein.

21. A method in accordance with claim 3 wherein the amount of said composition added to said infant formula is in an amount sufficient to provide a concentration of the human milk proteins or host resistance factors in said synthetic formula to about the concentration of human milk proteins or said host resistance factors as found in human milk when said synthetic infant formula is administered to an infant for consumption.

22. The method in accordance with claim 3 wherein said human milk proteins or host resistance factors comprise secretory immunoglobulin-A, lactoferrin, lactoperoxidase, lysozyme, alpha-lactalbumin, alpha-casein, beta-casein, or kappa-casein.

* * * * *